3,592,829
PROCESS FOR THE PREPARATION OF A NEW
LYSOLECITHIN MIXTURE
Hans Betzing, Heidestock, Germany, assignor to A. Nattermann & Cie G.m.b.H., Braunsfeld, Germany
No Drawing. Filed Apr. 7, 1969, Ser. No. 814,190
Claims priority, application Austria, Apr. 17, 1968,
A 3,762/68
Int. Cl. A23j 7/00; C07f 9/02
U.S. Cl. 260—403
9 Claims

ABSTRACT OF THE DISCLOSURE

Lysolecithins are obtained by a mild alcoholysis in which the percentage of the unsaturated fatty acids corresponds at least to the starting material.

The present invention relates to a process for the preparation of lysolecithin mixtures having a high unsaturated fatty acid content from phosphatidyl choline, i.e. lecithin of vegetable or animal origin.

Lysolecithin is a lecithin which has been rendered water-soluble by the splitting off of a fatty acid radical. It was previously prepared by hydrolysis of chemically pure lecithin (phosphatidyl choline) enzymatically by means of phospholipase A of snake poison. Also known is the preparation of a synthetic mono-oleyl-lysolecithin, a compound which showed an improvement in its ability to contract the heart in pharmacological investigations.

In the known enzymatic hydrolysis of lecithin with phospholipase A, the fatty acid in the $\beta$-position of the glycerol radical is essentially split off. Since the unsaturated fatty acids of lecihhin are in this $\beta$-position, only a lysolecithin which is relatively poor in unsaturated fatty acids is therefore obtained with the known enzymatic method.

Since it is known that the unsaturated and, in particular, the polyunsaturated fatty acids are of great importance for the therapeutic use of lecithins, there has long been the desire to prepare lysolecithins having a high content of polyunsaturated fatty acids. A synthesis is practically impossible because of the sensitivity of polyunsaturated fatty acids. Attempts to arrive at such lysolecithins by an unspecified aqueous hydrolysis of lecithins using acids or alkali hydroxides were unsuccessful since here essentially glycerylphosphoryl choline occurs by the splitting of both fatty acids and/or even a hydrolysis to glycerin phosphoric acid occurs by splitting of the choline radical as well.

It has now surprisingly been found that new, previously unknown lysolecithins are obtained by a mild alcoholysis in which the percentage of the unsaturated fatty acids corresponds at least to the starting material. The process for the preparation of lysolecithin or mixtures with lecithin containing predominantly lysolecithin or lecithin and glycerylphosphoryl choline with a high content of polyunsaturated fatty acids from chemically pure lecithin by splitting off of a fatty acid radical comprises, in accordance with the present invention, treating an alcoholic solution of lecithin at temperatures between 10° C. and the boiling temperature under the protection of an inert gas with the exclusion of air, light and moisture, with a weak alkali, the solution then being neutralized, and the resultant fatty acid esters being then separated by dialysis against petroleum ether or by repeated extraction with acetone. Where pure lysolecithin is desired, the resultant glycerylphosphoryl choline is removed by treatment with dichloroethane and/or dichloroethylene, and the lysolecithin is isolated in the normal way.

By the special, chemically induced splitting of the lecithin with weak alkali in alcoholic solution, reaction mixtures are obtained relatively quickly which have a high lysolecithin content since the splitting remains at the stage of the lyso-compounds through the alcoholysis in the presence of weak alkali or the splitting off of the second fatty acid takes place much more slowly than the splitting off of the first fatty acid. The formation of glycerylphosphoryl choline is largely repressed through the choice of the special medium and the mild alkali. The split off fatty acids are in the form of the esters of the alcohol used for the reaction, from which it follows that the reaction consists of an alcoholysis and/or ester interchange.

The main product, lysolecithin, surprisingly has a high content of unsaturated fatty acids. The fact that practically all the unsaturated, in particular also the essential fatty acids of phosphatidyl choline, are still present in the lysolecithin obtained according to the process of the invention proves that the hydrolytic splitting off of the fatty acids from the phosphatidyl choline molecule also takes places in the $\alpha$-position in which the saturated fatty acids are preferably present, in contrast to the enzymatic splitting with phospholipase A, which splits off practically exclusively the unsaturated fatty acids in the $\beta$-position. While exclusively $\alpha$-lysolecithin is formed by the attack of phospholipase, there occurs in the lysolecithin of the present process a mixture of $\alpha$- and $\beta$-lysolecithin, this being of great importance for biological action. Hajdu et al. (J. Pharmacol. Exptl. Therap. 120 [1957, p. 99]), who were able to detect an effect similar to digitalis on the isolated heart of a frog with $\alpha$-lysolecithins prepared by the action of phospholipase A on natural phosphatidyl choline, were able to find an increase in the minute volume as well as by improving the ability of the heart to contract when using a mixture of $\alpha$- and $\beta$-lysolecithin.

In general, the reaction mixtures can be used directly after separating the fatty acid esters which are formed. If, however, it is desired to obtain pure lysolecithin, then the resultant glycerylphosphoryl choline has to be removed from the reaction mixture, this taking place in accordance with the invention by using dichloroethane and/or dichloroethylene as solvent.

A particularly suitable starting material for lecithin is the phosphatidyl choline of the soya bean obtained according to German Patent 1,053,299. When using the process of the invention, there is formed with it up to 80% lysolecithin with more than 70% unsaturated fatty acids in the fatty acid section. Magnesium and calcium oxide are particularly suitable as the weak alkali, but it is also possible to use magnesium hydroxide carbonate and magnesium carbonate as well as sodium hydrogen carbonate and sodium carbonate. Ammonia too acts as a weak alkali in a low concentration in accordance with the present invention, and thus the splitting can also be carried out in anhydrous alcoholic ammonia solution. Methanol and ethanol can be used as solvents. Methanol in conjunction with activated magnesius and/or calcium oxide is the preferred embodiment.

The choice of the agent used for the ester interchange is, in conjunction with the reaction temperature and reaction time, of decisive influence on the composition of the final product. Moreover, in the case of the oxides of calcium and magnesium, their activity plays an important part. Thus, it has been found that lysolecithin content of about 50% is achieved with a commercial magnesium oxide, such as is e.g. available as Magnesia usta, after boiling for about 3 hours in methanol under reflux. If such a magnesium oxide is rendered inactive by standing in the air, then boiling has to take place for 7 hours under a reflux to arrive at the same result. It suffices with a magnesium oxide calcinated at 300–1000° C. heating may be carried out for 30 minutes under boil, or heating can be dispensed with altogether and the mixture merely stirred for about 4 hours at room temperature in order to obtain the same amount of lysolecithin. The formation of glycerylphosphoryl choline, which is going on all the time, can be reduced to a minimum if the reaction is allowed to proceed at temperatures below +20° C. (room temperature), the reaction time having to be extended correspondingly. The concentration of the phosphatidyl choline in the reaction solution has no mentionable influence on the course of the reaction. This is not, however, the case with the amount of magnesium oxide and/or calcium oxide. An increase of these ester substances, bringing about the ester interchange, leads to an accelerated formation lysolecithin, but also at the same time to a rise in undesirable glycerylphosphoryl choline. A decrease in concentration slows down the formation of lysolecithin and leads of necessity to a slowing reaction time.

For the neutralization, any diluted acids and solutions of acidic salts can be used. Thus, for example, a diluted hydrochloric acid or also a so-called acidic aluminum oxide as often used as anionotropic substance in chromatography is adequate. Inorganic and organic compounds can be used as acids or salts as long as they, or their reaction products, are not too soluble in the liquid systems since additional precipitation, or washing steps, would have to be provided if soluble materials were provided. Examples for the acids are, apart from the cited hydrochloric acid, organic acids such as acetic acid or formic acid. As salts there are to be named sodium hydrogen sulphate, sodium dihydrogen phosphate, or the primary tartrate.

The products obtained according to the present invention are as a rule mixtures of substances which contain, apart from lysolecithin, also phosphatidyl choline which has not been used up as well as glycerylphosphoryl choline and fatty acid esters. By means of customary dialysis through a thin rubber tube or by a repeated extraction with cold acetone, it is possible to remove the fatty acid esters rapidly and simply in a quantitative manner. The resultant mixture of lysolecithin, phosphatidyl choline and glycerylphosphoryl choline can be used for intravenous injection. In order to obtain a clear solution for this, it is recommended to add a small amount of an alkali salt of deoxycholic acid and/or apocholic acid. This also results in rendering the remaining fraction of non-water-soluble lecithin in the reaction mixture completely water-soluble.

Should the removal of the glycerylphosphoryl choline be desired, the mixture of substances is treated with dichloroethane and/or dichloroethylene to which 5% ethanol is desirably added to improve the yield. Phosphatidyl choline and lysolecithin then pass into solution, while the glycerylphosphoryl choline remains behind undissolved so that it can be removed practically quantitatively by subsequent filtration.

The lysolecithin can be isolated and determined quantitatively from the resultant mixture using a counter-current distribution in the system: petroleum ether 98% methanol (2:1) or by preparative thin layer chromatography on silica gel plates. A typical analysis of a lysolecithin obtained according to the process of the invention from phosphatidyl choline of the soya bean shows the following values:

total phosphorous—5.95%
choline—23.5%
fatty acids—52.00%
molar ratio of phosphorous to choline—1.01
iodine number—77

The gas-chromatographic analysis of the fatty acids of the lysolecithin gives the following average values:

Saturated: Percent
$C_{16}$ —————————————————— 13.0
$C_{18_1}$ —————————————————— 2.5
Unsaturated:
$C_{18_2}$ —————————————————— 7.0
$C_{18_3}$ —————————————————— 72.0
$C_{18}$ —————————————————— 5.5

Compare with this, a lysolecithin obtained from the same starting material, namely phosphatidyl choline from soya beans, but by means of the enzymatic hydrolysis process by snake poison from *Crotalus adamanteus*, shows a clearly different fatty acid composition:

Saturated: Percent
$C_{16}$ —————————————————— 26.7
$C_{18_1}$ —————————————————— 4.5
Unsaturated:
$C_{18_2}$ —————————————————— 6.7
$C_{18_3}$ —————————————————— 57.3
$C_{18}$ —————————————————— 4.8

If one starts from animal phosphatidyl chloine, e.g. that obtained from egg lecithin, which contains innately less unsaturated fatty acids, then then present process surprisingly gives a lysolecithin containing about 41% unsaturated fatty acids, while in the known method by enzymatic hydrolysis using snake poison a lysolecithin is obtained with about 95% saturated fatty acids, i.e. a product which has only a small fraction of about 5% unsaturated fatty acids.

The following examples are offered to further illustrate, but not to limit, the invention:

EXAMPLES

Example 1

300 g. chemically pure phosphatidyl choline, obtained from the phosphatide mixture of the soya bean, are dissolved in 4.5 l. methanol while stirring and under the protection of an inert gas and are stirred with 30 g. magnesium oxide, activated by heating for 1.5 hours at 850°, with the exclusion of air and moisture for 4.2 hours at 18° C. After the separation of the magnesium oxide, preferably using a filter capsule, the solution is stirred for neutralization for 20–30 minutes in 45 g. acid aluminum hydroxide, and is then filtered. After the evaporation of the methanol in vacuo under the protection of an inert gas, the viscous, oily residue is transferred by means of petroleum ether into a suitable rubber tube and is dialyzed for 8 hours against petroleum ether (B.P. 30–50° C.) in the Soxhlet apparatus. After drawing off the solvent in the vacuum under nitrogen, there remains in the dialysate the fatty acid methyl esters (yield 102 g.=34%), and in the retained material, an almost colorless, pasty substance which consists of a mixture of lecithin, lysolecithin and glycerylphosphoryl choline. For separating this latter compound, the substance is dissolved in 1.8 l. dichloroethane-ethanol (95:5), filtered off from insoluble material and the clear solution is freed from solvent by distillation in vacuo under nitrogen. 155 g. (=52%) of an almost colorless substance of pasty consistency result which, after thin-layer chromatographic separation and subsequent phosphorous determination, turns out to consist of 52.5% lysolecithin and 47.5% lecithin.

The mixture of substances gives the following analytical values:

iodine number—89
phosphorous—4.75%
choline—18.9%
fatty acids—61.5%
molar ratio phosphorous: choline—1.01

The gas chromatographic determination of the fatty acids gives the following average values:

| | Percent |
|---|---|
| Palmitic acid | 10.8 |
| Stearic acid | 2.5 |
| Oleic acid | 6.5 |
| Linoleic acid | 74.8 |
| Linolenic acid | 5.4 |

Example 2

300 g. phosphatidyl choline are dissolved as described above in 6 l. methanol and stirred for 1 hour at room temperature with 30 g. calcium oxide powder activated by heating for 2 hours at 450° C. The oxide is filtered off and the methanolic solution is then neutralized by the addition of 5 ml. 5% methanolic hydrochloric acid. After evaporating the solvent in vacuo under nitrogen, the residue is repeatedly etxracted with cold acetone for separating the fatty acid methyl esters. It is freed of acetone by distillation in vacuo and then dissolved in about 2 l. dichloroethane-ethanol (95:5). After filtering, the clear solution is freed of solvent in vacuo under nitrogen. 195 g. (=65%) of an almost colorless substance of pasty consistency result which, upon thin-layer and column chromatographic analysis, turns out to consist of 55% lysolecithin and 45% lecithin.

Example 3

200 g. chemically pure phosphatidyl choline are dissolved in 1 l. ethanol while stirring and under the protection of an inert gas and are stirerd with 30 g. calcium oxide (activated by heating for 2 hours at 450°C.) for 10 hours at 40° C. with the exclusion of air and moisture. After filtering off the oxide, the ethanolic solution is stirred for neutralization with 40 g. acid aluminum oxide for 20 minutes, is then filtered and finally the solvent is distilled off in vacuo under nitrogen. For removing the fatty acid ethyl esters formed, the residue is extracted repeatedly with cold acetone and is then freed of acetone by distillation in vacuo under nitrogen. There remains 150 g. (=75%) of a mixture of 45% lysolecithin, 50% lecithin and 5% glycerylphosphoryl choline.

Example 4

100 g. phosphatidyl choline are dissolved in 1.2 l. methanol and are stirred with 10 g. activated calcium oxide, as described in Example 3, for 1.33 hours at 20° C. After removal of the oxide, the solution is stirred for neutralization for a further 30 minutes with 5 g. sodium dihydrogen phosphate, is then filtered and the methanol is then distilled off in vacuo under the protection of an inert gas. The resultant fatty acid methyl esters are removed quantitatively by dialysis in a rubber tube against petroleum ether (see Example 1). After distilling off the petroleum ether under nitrogen, the residue is dissolved in 400 ml. dichloroethane-ethanol (95:5), filtered off from the insoluble material and the solvent is distilled off in vacuo under nitrogen. 22 g. of a mixture of 80% lysolecithin and 20% lecithin result.

Example 5

300 g. phosphatidyl choline of vegetable origin are dissolved while stirring and under the protection of an inert gas in 3 l. methanol and are heated with 37.5 g. commercial magnesium oxide (*Magnesia usta*) for 3.2 hours under reflux. After cooling the reaction mixture to room temperature, the further working up takes place as in Example 1. Yield: 165 g. of a mixture of 51% lysolecithin and 49% lecithin.

It will be obvious to those skilled in the art that various changes may be made without departing from the scope of the invention, and the invention is not to be considered limited to what is described in the specification..

What is claimed is:

1. Process for the preparation of new lysolecithin mixtures having a high fatty acid content and/or mixture containing predominantly such lysolecithins with lecithin or lecithin and glycerylphosphoryl choline from chemically pure lecithin of vegetable or animal origin, comprising transesterifying lecithin in an alcoholic solution with a weak alkali at temperatures between 10° C. and the boiling temperature under the protection of an inert gas with the exclusion of light, air and moisture; neutralizing the resultant solution with an acidic material; and separating fatty acid esters from the lysolecithin containing solution.

2. Process according to claim 1, wherein an oxide of magnesium or calcium is used as the weak alkali.

3. Process according to claim 1, wherein a methanolic solution is used and activated magnesium and/or calcium oxide as the weak alkali and temperatures between 10 and 20° C. are used.

4. Process according to claim 1, wherein an ethanolic solution is used and activated calcium oxide as the weak alkali and elevated temperatures are used.

5. Process according to claim 1, wherein the reaction mixture is neutralized by treatment with acid aluminum oxide.

6. A process in accordance with claim 1, wherein said fatty acid esters are separated from said neutralized solution by dialysis against petroleum ether or by repeated extraction with cold acetone.

7. A process in accordance with claim 1, further comprising removing glycerylphosphoryl choline from the fatty acid free neutralized solution by treatment with dichloroethane or dichloroethylene.

8. Process according to claim 7, wherein dichloroethane and/or dichloroethylene, to which 5% ethanol has been added, is used for removing the glycerylphosphoryl choline.

9. A process in accordance with claim 1 further comprising isolating the lysolecithin.

References Cited

UNITED STATES PATENTS

| 3,031,478 | 4/1962 | Klenk et al. | 260—403 |
| 3,499,017 | 3/1970 | Davis | 260—403 |

ELBERT L. ROBERTS, Primary Examiner